United States Patent
Woo

(10) Patent No.: US 10,220,877 B2
(45) Date of Patent: Mar. 5, 2019

(54) REAR WHEEL STEERING APPARATUS

(71) Applicant: HYUNDAI MOBIS CO., LTD., Seoul (KR)

(72) Inventor: Myeong Nam Woo, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 99 days.

(21) Appl. No.: 15/628,918

(22) Filed: Jun. 21, 2017

(65) Prior Publication Data
US 2017/0369099 A1    Dec. 28, 2017

(30) Foreign Application Priority Data

Jun. 22, 2016 (KR) .................. 10-2016-0078287

(51) Int. Cl.
*B62D 5/04* (2006.01)
*B62D 7/22* (2006.01)
*B62D 7/16* (2006.01)
*B62D 7/15* (2006.01)

(52) U.S. Cl.
CPC ........... *B62D 7/224* (2013.01); *B62D 5/0403* (2013.01); *B62D 5/0427* (2013.01); *B62D 5/0445* (2013.01); *B62D 7/1581* (2013.01); *B62D 7/163* (2013.01); *B62D 7/228* (2013.01)

(58) Field of Classification Search
CPC ...... Y10T 403/559; B62D 5/0403; B62D 5/04
See application file for complete search history.

(56) References Cited

U.S. PATENT DOCUMENTS

| 6,044,948 A * | 4/2000 | Okada ................ F16D 13/683 |
| | | 192/48.614 |
| 2015/0040710 A1* | 2/2015 | Wagner .................. F16D 3/10 |
| | | 74/473.3 |

FOREIGN PATENT DOCUMENTS

KR      1998-015086 A    5/1998

* cited by examiner

*Primary Examiner* — Kevin Hurley
(74) *Attorney, Agent, or Firm* — Knobbe Martens Olson & Bear LLP

(57) ABSTRACT

A rear wheel steering apparatus may include: a driving part housed in a housing part; a rotating part rotated by the driving part; a moving shaft part connected to tie rods, and screwed to the rotating part; a spline plate spline-coupled to the moving shaft part so as to restrict rotation of the moving shaft part; and a space maintaining part protruding from the moving shaft part or the spline plate, and maintaining a space between the moving shaft part and the spline plate.

10 Claims, 6 Drawing Sheets

REAR WHEEL STEERING APPARATUS

CROSS-REFERENCES TO RELATED APPLICATIONS

The present application claims priority to Korean application number 10-2016-0078287, filed on Jun. 22, 2016, which is incorporated by reference in its entirety.

BACKGROUND OF THE INVENTION

The present invention relates to a rear wheel steering apparatus, and more particularly, to a rear wheel steering apparatus which is capable of reducing friction between a moving shaft part and a spline plate, and improving operation performance.

In general, a steering apparatus for a two-wheeled vehicle controls the traveling direction of the vehicle by steering only a front wheel. At this time, since the lateral forces of the front and rear wheels are generated at different times, the traveling direction of the vehicle does not coincide with the gaze direction of a driver.

On the other hand, a steering apparatus for a four-wheeled vehicle can steer the rear wheels of the vehicle depending on the front wheels and vehicle velocity, thereby matching the time points that the lateral forces of the front and rear wheels are generated. Therefore, the traveling direction of the four-wheeled vehicle coincides with the gaze direction of a driver, and the turning radius of the vehicle is reduced.

When a moving shaft of the conventional rear wheel steering apparatus is tilted, the moving shaft may be stuck to a spline plate. In this case, friction may be increased to degrade the operation performance of the rear wheel steering apparatus, such as response. Therefore, there is a demand for a structure capable of solving the problem.

The related art is disclosed in Korean Patent Publication No. 1998-0015086 published on May 25, 1998 and entitled "Rear wheel steering apparatus for vehicle".

SUMMARY OF THE INVENTION

Embodiments of the present invention are directed to a rear wheel steering apparatus capable of improving operation performance by reducing friction between a moving shaft part and a spline plate.

In one embodiment, a rear wheel steering apparatus may include: a driving part housed in a housing part; a rotating part rotated by the driving part; a moving shaft part connected to tie rods, and screwed to the rotating part; a spline plate spline-coupled to the moving shaft part so as to restrict rotation of the moving shaft part; and a space maintaining part protruding from the moving shaft part or the spline plate, and maintaining a space between the moving shaft part and the spline plate.

The moving shaft part may include: a moving shaft screwed to the rotating part, and having both ends connected to the respective tie rods; and a serrated shaft part formed on the outer circumferential surface of the moving shaft, spline-coupled to the spline plate, and having the space maintaining part coupled thereto.

The space maintaining part may have such a shape that the width thereof decreases away from the rotation center of the moving shaft.

The space maintaining part may have a curved surface facing the spline plate.

The plurality of space maintaining parts may be arranged on the outer circumferential surface of the serrated shaft part.

The space maintaining part may be integrated with the serrated shaft part.

The spline plate may include: a plate part coupled to the housing part, and restricted from rotating; and a serrated plate part formed on the inner circumferential surface of the plate part, spline-coupled to the moving shaft part, and having the space maintaining part coupled thereto.

The space maintaining part may have such a shape that the width thereof decreases toward the rotation center of the moving shaft part.

The space maintaining part may have a curved surface facing the moving shaft part.

The plurality of space maintaining parts may be arranged on the inner circumferential surface of the serrated plate part.

DESCRIPTION OF SPECIFIC EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Figure 1:
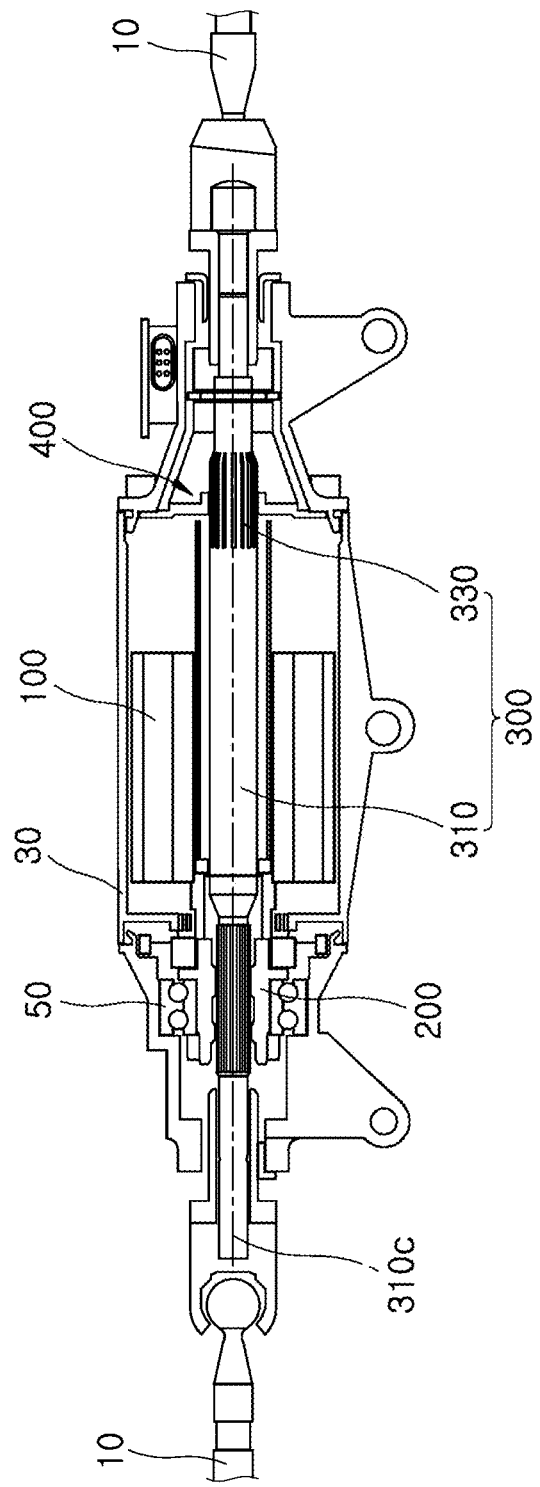
FIG. 1 is a schematic cross-sectional view of a rear wheel steering apparatus in accordance with an embodiment of the present invention.
Figure 2:
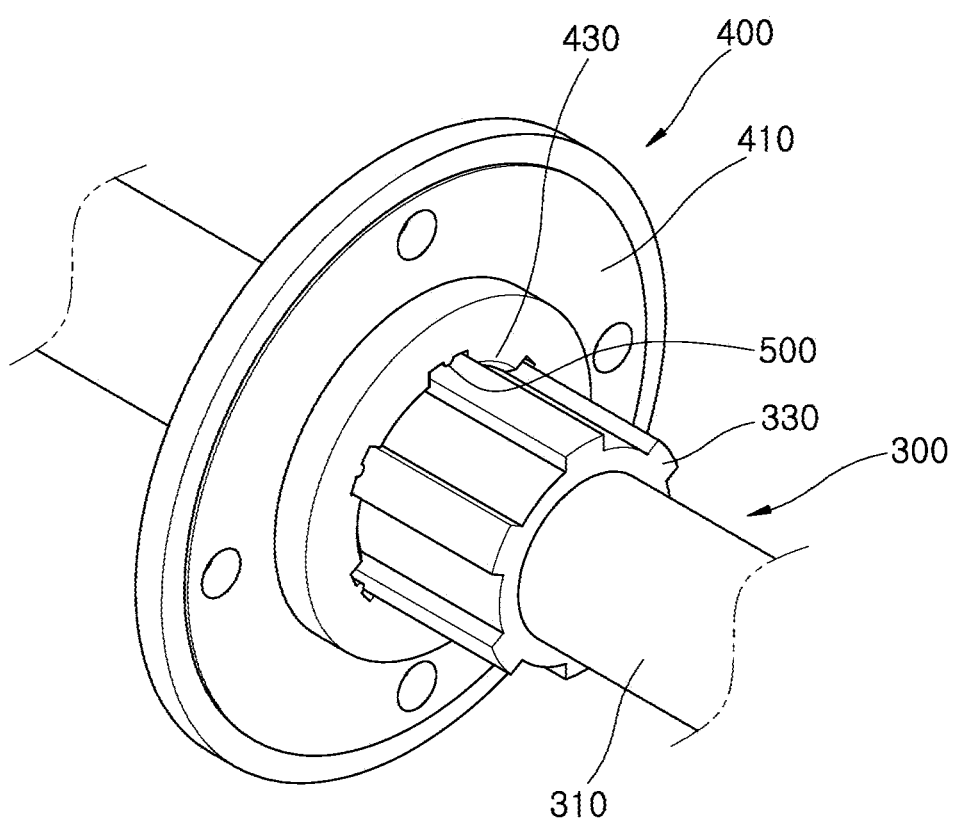
FIG. 2 is a diagram illustrating that a moving shaft part and a spline plate are coupled to each other in accordance with the embodiment of the present invention.

FIG. 1 is a schematic cross-sectional view of a rear wheel steering apparatus in accordance with an embodiment of the present invention, and FIG. 2 is a diagram illustrating that a moving shaft part and a spline plate are coupled to each other in accordance with the embodiment of the present invention.

Referring to FIGS. 1 and 2, the rear wheel steering apparatus 1 in accordance with the present embodiment may include a driving part 100, a rotating part 200, a moving shaft part 300, a spline plate 400 and a space maintaining part 500, and steer rear wheels (not illustrated) by moving tie rods 10 connected to the moving shaft part 300.

The driving part 100 may be housed in a housing part 30. In the present embodiment, a hollow motor having a hollow portion formed therein may be exemplified as the driving part 100, and the moving shaft part 300 may be inserted into the hollow portion so as to move in the longitudinal direction of the moving shaft part 300 (the side-to-side direction in FIG. 1). When power is applied from outside, the driving part 100 may convert the power into torque to rotate the rotating part 200.

The rotating part 200 may be rotated by the driving part 100. In the present embodiment, the rotating part 200 may be connected to a rotating shaft (not illustrated) of the driving part 100, and screwed to the moving shaft part 300 through a screw thread formed on the inner surface thereof. Between the rotating part 200 and the housing part 30, a bearing 50 may be installed to rotatably support the rotating part 200.

The moving shaft part 300 may be connected to the tie rod 10 and screwed to the rotating part 200. In the present embodiment, the moving shaft part 300 may include a moving shaft 310 and a serrated shaft part 330.

The moving shaft 310 may be screwed to the rotating part 200 through a screw thread formed on the outer circumferential surface thereof, and have both ends connected to the tie rods 10. Thus, when the moving shaft 310 is reciprocated by the rotating part 200 and the spline plate 400, the moving shaft 310 may rotate the rear wheels through the tie rods 10 connected to both ends thereof.

The serrated shaft part 330 may be formed on the outer circumferential surface of the moving shaft 310, and spline-coupled to the spline plate 400. In the present embodiment, the serrated shaft part 330 can be integrated with the moving shaft 310, which makes it possible to reduce the number of parts while improving the assembling property and durability of the apparatus.

In the present embodiment, when the moving shaft part 300 is spline-coupled to the spline plate 400, the rotation of the moving shaft part 300 may be restricted. In this state, while the moving shaft part 300 is screwed to or separated from the rotating part 200, the moving shaft part 300 may be linearly reciprocated in the axial direction (the side-to-side direction in FIG. 1).

The spline plate 400 may be spline-coupled to the moving shaft part 300, restrict the rotation of the moving shaft part 300, and allow the longitudinal movement of the moving shaft part 300. In the present embodiment, the spline plate 400 may include a plate part 410 and a serrated plate part 430.

The plate part 410 may be fixed to the housing part 30 by a fastening member (not illustrated) such as a bolt, and restricted from rotating about the housing part 30.

The serrated plate part 430 may be formed on the inner circumferential surface of the plate part 410, and spline-coupled to the moving shaft part 300 so as to restrict the rotation of the moving shaft part 300, while allowing the moving shaft part 300 to move in the longitudinal direction thereof. In the present embodiment, the serrated plate part 430 can be integrated with the plate part 410, which makes it possible to reduce the number of parts while improving the assembling property and durability of the apparatus.

The space maintaining part 500 may protrude from the moving shaft part 300 or the spline plate 400, maintain a space between the moving shaft part 300 and the spline plate 400, and prevent the moving shaft part 300 from being stuck to the spline plate 400 by tilting of the moving shaft part 300, thereby preventing an increase of friction or a degradation of response.

Figure 3A:
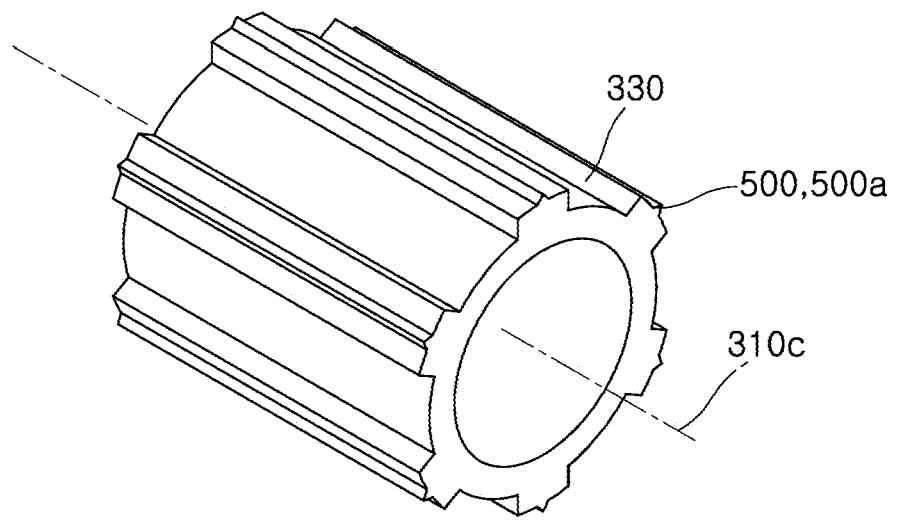
FIGS. 3A and 3B are a diagram illustrating a moving shaft part and a space maintaining part having a triangular cross-section in accordance with a first embodiment of the present invention.
Figure 3B:
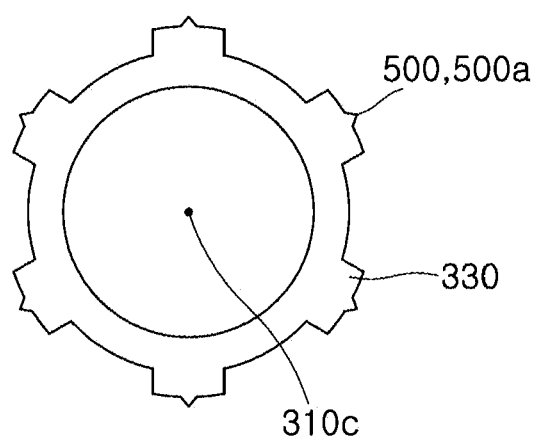
Figure 4A:
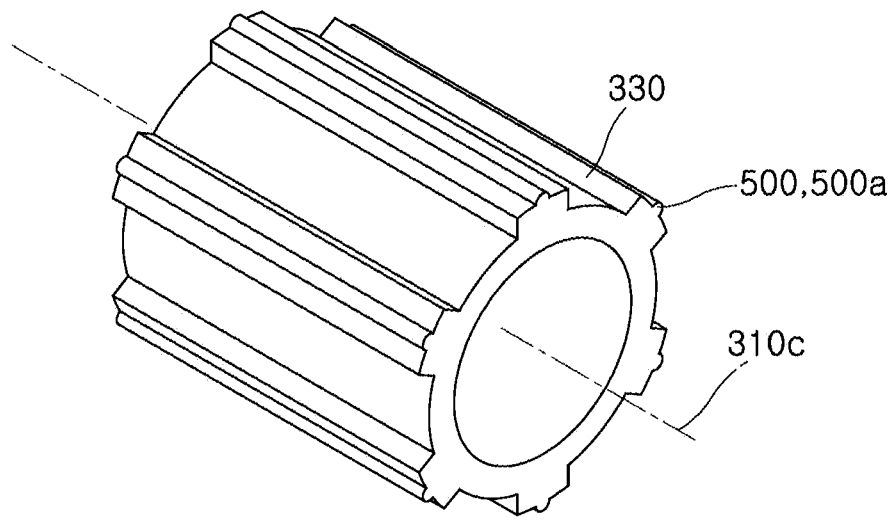
FIGS. 4A and 4B are a diagram illustrating the moving shaft part and a space maintaining part having a circular cross-section in accordance with the first embodiment of the present invention.
Figure 4B:
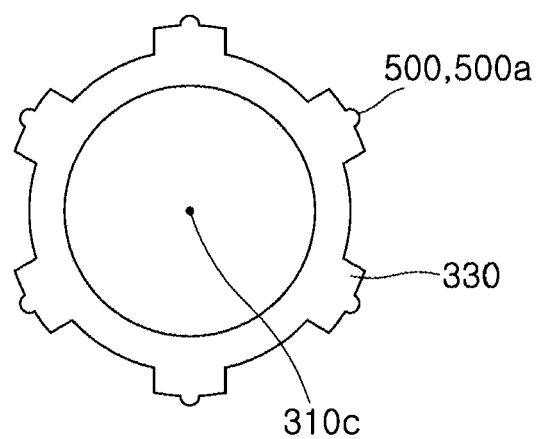

FIGS. 3A and 3B are a diagram illustrating a moving shaft part and a space maintaining part having a triangular cross-section in accordance with a first embodiment of the present invention, and FIGS. 4A and 4B are a diagram illustrating the moving shaft part and a space maintaining part having a circular cross-section in accordance with the first embodiment of the present invention.

Referring to FIGS. 3 and 4, the space maintaining part 500a in accordance with the first embodiment of the present invention may protrude from the moving shaft part 300. Specifically, the space maintaining part 500a may be formed on the serrated shaft part 330 of the moving shaft part 300.

In the first embodiment, the space maintaining part 500a may protrude from the outer circumferential surface of the serrated shaft part 330, and have such a shape that the width thereof decreases in the radial direction from the rotation center 310c of the moving shaft 310. Thus, the contact area between the space maintaining part 500a and the serrated plate part 430 can be minimized to reduce friction, thereby preventing a degradation in longitudinal movement performance of the moving shaft part 300.

In the first embodiment, the space maintaining part 500a may have a curved surface facing the spline plate 400, thereby reducing an occurrence of friction and noise by contact with the spline plate 400 (refer to FIGS. 4A and 4B).

In the first embodiment, the plurality of space maintaining parts 500a may be arranged on the outer circumferential surface of the serrated shaft part 330, and constantly maintain the space between the moving shaft part 300 and the spline plate 400 along the circumferential direction, thereby preventing the moving shaft part 300 from being stuck to a specific portion of the spline plate 400.

In the first embodiment, the space maintaining parts 500a can be integrated with the serrated shaft part 330, which makes it possible to reduce the number of parts while improving the assembling property and durability of the apparatus.

Figure 5A:
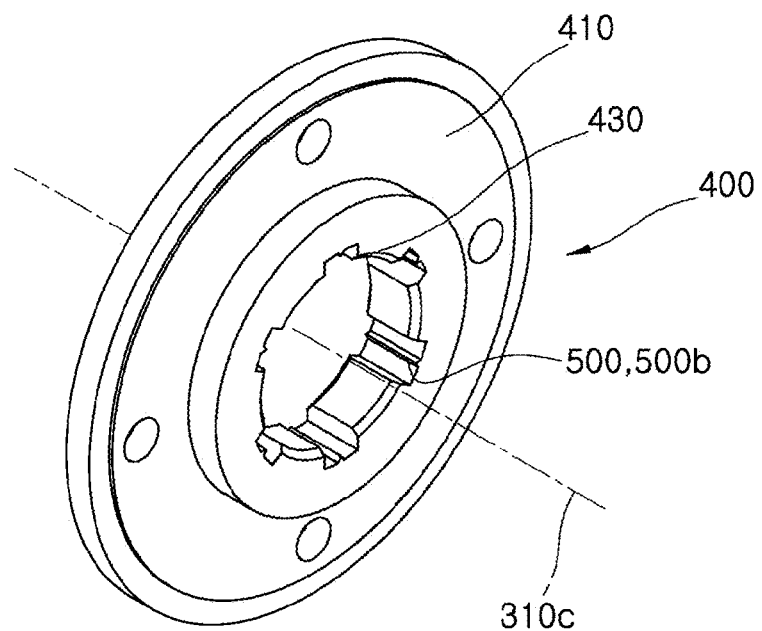
FIGS. 5A and 5B are a diagram illustrating a spline plate and a space maintaining part having a triangular cross-section in accordance with a second embodiment of the present invention.
Figure 5B:
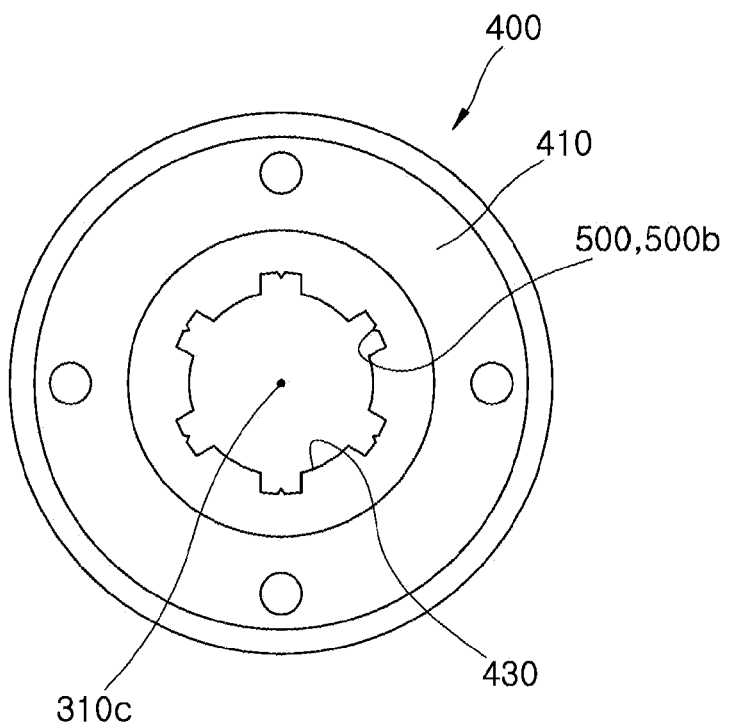
Figure 6A:
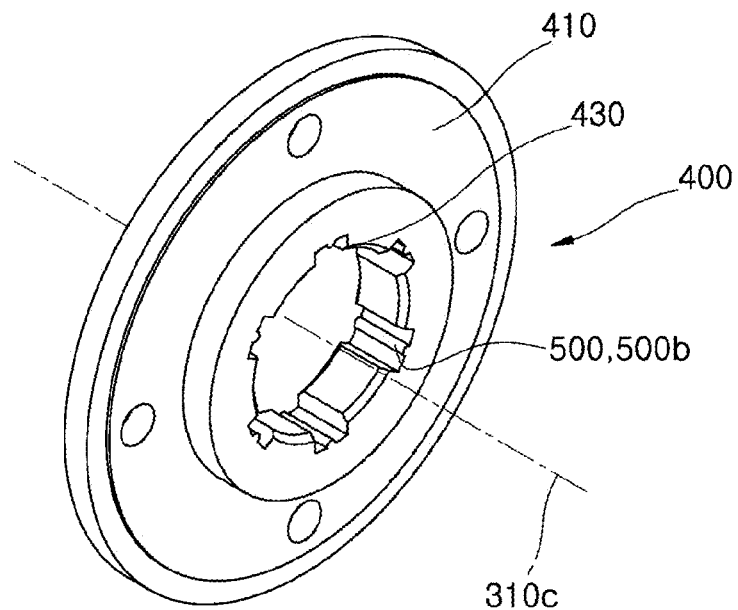
FIGS. 6A and 6B are a diagram illustrating the spline plate and a space maintaining part having a circular cross-section in accordance with the second embodiment of the present invention.
Figure 6B:
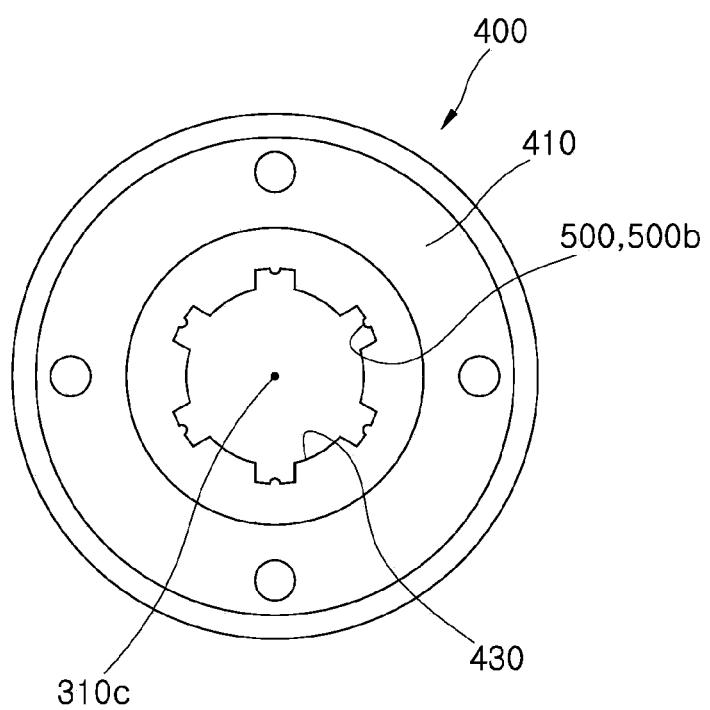

FIGS. 5A and 5B are a diagram illustrating a spline plate and a space maintaining part having a triangular cross-section in accordance with a second embodiment of the present invention, and FIGS. 6A and 6B are a diagram illustrating the spline plate and a space maintaining part having a circular cross-section in accordance with the second embodiment of the present invention.

Referring to FIGS. 5 and 6, the space maintaining part 500b in accordance with the second embodiment of the present invention may be formed on the spline plate 400, or specifically the serrated plate part 430.

In the second embodiment, the space maintaining part 500b may protrude from the inner circumferential surface of the serrated plate part 430, and have such a shape that the width thereof decreases in the radial direction toward the rotation center 310c of the moving shaft 310. Thus, the contact area between the space maintaining part 500b and the moving shaft part 300 can be minimized to reduce friction, thereby preventing a degradation in longitudinal movement performance of the moving shaft part 300.

In the second embodiment, the space maintaining part 500b may have a curved surface facing the moving shaft part 300, thereby reducing an occurrence of friction and noise by contact with the moving shaft part 300 (refer to FIGS. 6A and 6B).

In the second embodiment, the plurality of space maintaining parts 500b may be arranged on the outer circumferential surface of the serrated plate part 430, and constantly maintain the space between the moving shaft part 300 and the spline plate 400 along the circumferential direction, thereby preventing the moving shaft part 300 from being stuck to a specific portion of the spline plate 400.

In the second embodiment, the space maintaining parts 500b can be integrated with the serrated plate part 430, which makes it possible to reduce the number of parts while improving the assembling property and durability of the apparatus.

Hereafter, the operation principle and effect of the rear wheel steering apparatus 1 in accordance with the embodiment of the present invention will be described as follows.

When the control unit (not illustrated) of the vehicle operates the driving part 100 to generate rotary power, the rotating part 200 may be rotated in the housing part 30. The moving shaft part 300 may be screwed to the rotating part 200, spline-coupled to the spline plate 400, and restricted from rotating about the housing part 30. Therefore, while the moving shaft part 300 and the rotating part 200 are screwed to each other or separated from each other, the moving shaft part 300 may be moved in the longitudinal direction thereof.

When the moving shaft part 300 is moved in the longitudinal direction, the tie rods 10 connected to the moving shaft part 300 may be moved to switch the traveling direction of the wheels or specifically the rear wheels.

In the present embodiment, the rear wheel steering apparatus 1 may have the space maintaining parts 500 formed on the moving shaft part 300 or the spline plate 400, and constantly maintain the space between the moving shaft part 300 and the spline plate 400. Therefore, although the moving shaft part 300 is tilted at a predetermined angle, the moving shaft part 300 can be prevented from being stuck to the spline plate 400, which makes it possible to prevent a damage by friction and an occurrence of noise while reducing a degradation of response.

The rear wheel steering apparatus 1 in accordance with the present embodiment can maintain the space between the moving shaft part 300 and the spline plate 400, and thus reduce friction between the moving shaft part 300 and the spline plate 400, thereby improving the operation performance such as response.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A rear wheel steering apparatus comprising:
   a driving part housed in a housing part;
   a rotating part rotated by the driving part;
   a moving shaft part connected to tie rods, and screwed to the rotating part;
   a spline plate spline-coupled to the moving shaft part so as to restrict rotation of the moving shaft part; and
   a space maintaining part protruding from the moving shaft part or the spline plate, and maintaining a space between the moving shaft part and the spline plate.

2. The rear wheel steering apparatus of claim 1, wherein the moving shaft part comprises:
   a moving shaft screwed to the rotating part, and having both ends connected to the respective tie rods; and
   a serrated shaft part formed on the outer circumferential surface of the moving shaft, spline-coupled to the spline plate, and having the space maintaining part coupled thereto.

3. The rear wheel steering apparatus of claim 2, wherein the space maintaining part has such a shape that the width thereof decreases away from the rotation center of the moving shaft.

4. The rear wheel steering apparatus of claim 3, wherein the space maintaining part has a curved surface facing the spline plate.

5. The rear wheel steering apparatus of claim 2, wherein the plurality of space maintaining parts are arranged on the outer circumferential surface of the serrated shaft part.

6. The rear wheel steering apparatus of claim 5, wherein the space maintaining part is integrated with the serrated shaft part.

7. The rear wheel steering apparatus of claim 1, wherein the spline plate comprises:
   a plate part coupled to the housing part, and restricted from rotating; and
   a serrated plate part formed on the inner circumferential surface of the plate part, spline-coupled to the moving shaft part, and having the space maintaining part coupled thereto.

8. The rear wheel steering apparatus of claim 7, wherein the space maintaining part has such a shape that the width thereof decreases toward the rotation center of the moving shaft part.

9. The rear wheel steering apparatus of claim 8, wherein the space maintaining part has a curved surface facing the moving shaft part.

10. The rear wheel steering apparatus of claim 7, wherein the plurality of space maintaining parts are arranged on the inner circumferential surface of the serrated plate part.

* * * * *